(Model.)

S. GARWOOD.
ROLLER BEARING.

No. 499,019. Patented June 6, 1893.

WITNESSES:
H. B. Bradshaw
George Eob

INVENTOR
Spencer Garwood

UNITED STATES PATENT OFFICE.

SPENCER GARWOOD, OF MILFORD CENTRE, OHIO.

ROLLER-BEARING.

SPECIFICATION forming part of Letters Patent No. 499,019, dated June 6, 1893.

Application filed February 11, 1892. Serial No. 421,220. (Model.)

*To all whom it may concern:*

Be it known that I, SPENCER GARWOOD, a citizen of the United States, residing at Milford Centre, in the county of Union and State of Ohio, have invented a certain new and useful Improvement in Roller-Bearings, of which the following is a specification.

My invention relates to the improvement of roller bearings of that class in which the bearing rollers are mounted between a shaft and suitable boxing and the objects of my invention are to provide an improvement in the manner of journaling said rollers within said boxing; to provide a uniform bearing contact of the rollers on the periphery of the shaft and to otherwise produce an improved roller bearing in which the friction is taken up uniformly, and to produce other improvements which will be more specifically pointed out hereinafter. These objects I accomplish in the manner illustrated in the accompanying drawings, in which—

Figure 1:
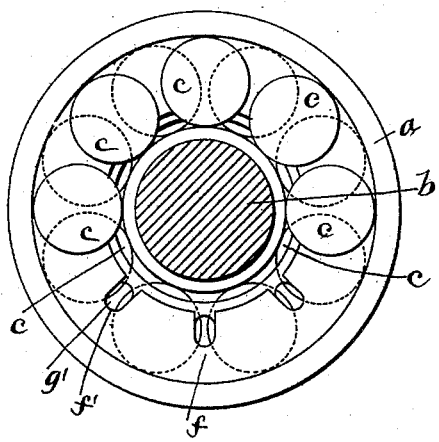
Figure 2:
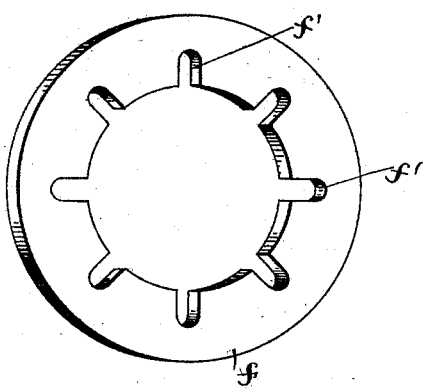
Figure 3:
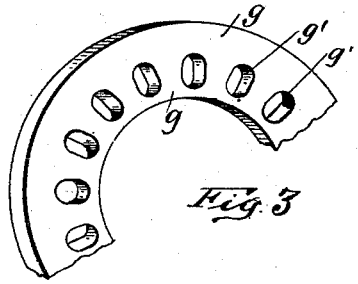
Figure 4:
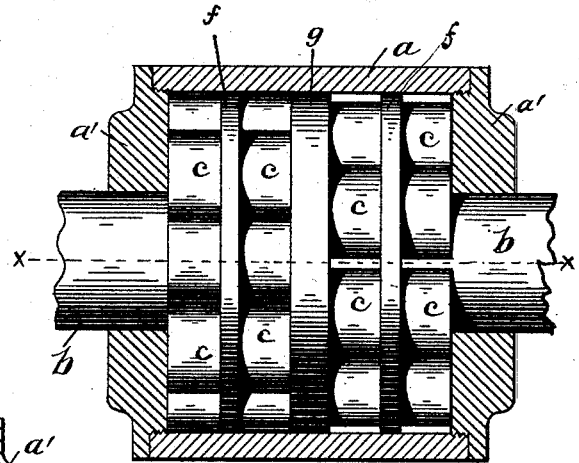
Figure 5:
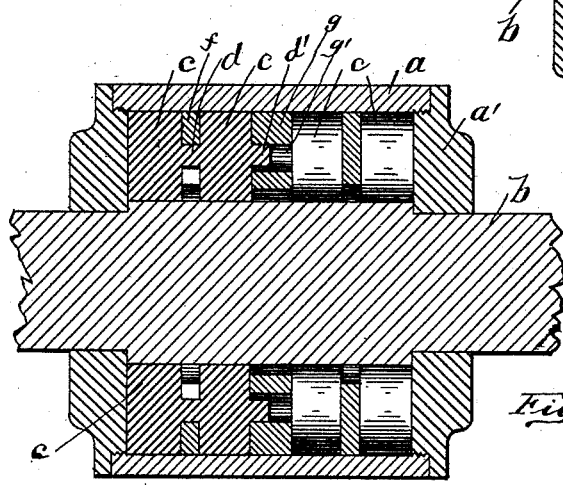
Figure 6:
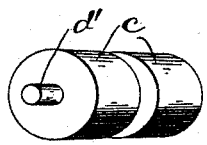

Figure 1 is an end view of my improved bearing and boxing therefor showing the shaft in cross section, and showing in full and dotted lines the relative positions of two sets of rollers. Fig. 2 is a view in perspective of one of the roller bearing rings. Fig. 3 is a perspective view of a portion of the central division bearing rings. Fig. 4 is a plan view of the bearing rollers and their bearing rings and showing the casing in sectional view. Fig. 5 is a sectional view on line $x$ $x$ of Fig. 4 and Fig. 6 is a view in perspective of two rollers having common or integral shafts.

Similar letters refer to similar parts throughout the several views.

$a$ represents the cylindrical casing or boxing provided with suitable end caps $a'$. Through these end caps passes loosely and centrally a spindle $b$.

$c$ represents double rollers or pairs of rollers which as shown in the drawings consist of two ordinary bearing rollers which are connected by central stems or shafts $d$ formed integral therewith. The inner one of each of said rollers $c$ is provided with a central end bearing shaft or gudgeon $d'$ which projects inwardly in the line of the axis of said rollers.

$f$ and $f$ indicate bearing rings the inner surface of which has formed at equidistant points therein radial bearing recesses or seats $f'$.

$g$ represents a division ring which separates two sets of bearing rollers. This ring $g$ is as shown in the drawings provided with a circular series of oblong bearing openings $g'$, the number of said openings being double the number of bearing recesses in the rings $f$ and $f$. In arranging the roller bearings and parts thereof within the boxing, I cause the central stems $d$ of the rollers $c$ to be inserted within the recesses $f'$ of the rings $f$ and $f$. The set of rollers thus formed and mounted is duplicated and said roller sets so manipulated as to cause an insertion of the end gudgeons $d'$ of one set of rollers $c$ into alternate openings $g'$ of the ring $g$. The gudgeons of the remaining set of rollers $c$ which are arranged on the opposite side of said ring $c$ are caused to be inserted in the remaining openings $g'$ of said ring. The sets of bearing rollers thus connected are made to surround the shaft $b$ with the periphery of which said rollers are in bearing contact. The bearing rollers and rings connected as above described are inclosed in the usual manner within the cylindrical boxing $a$ and between the end caps $a'$.

From the construction and arrangement of parts herein shown and described it will readily be seen that the arrangement of the rollers of one set out of alignment with those of the other set results in a bearing of the rollers of one set upon the shaft opposite points which are midway between the bearing points of the other set. It will thus be seen that a complete and uniform bearing of the rollers is distributed over the periphery of the shaft and the friction will be taken up uniformly. It will also be observed that in the construction of my improved roller bearing, I provide bearing recesses in the inner sides of the rings $f$ instead of in the peripheries thereof, as is ordinarily done. By this arrangement of bearing recesses it will be seen that any tendency of the rollers to drop from place when a set is removed from the boxing is obviated.

It is evident that I might employ in place of the two sets of roller bearings herein described any number of said sets to accord with the length or character of the bearing or boxing.

Having now fully described my invention, what I claim, and desire to secure by Letters Patent, is—

1. In a roller bearing the combination with two sets of bearing rollers, of a central division ring between said sets, having bearing openings in said division ring in which the gudgeons of the bearing rollers of said roller sets bear alternately as described, a central shaft about which said rollers bear and rotate and a casing about said rollers substantially as and for the purpose specified.

2. In a roller bearing the combination of two sets of rollers, each roller of each set having a central connecting stem and a gudgeon at one side, bearing rings $f$ having radial recesses $f'$ in their inner sides which receive the connecting stems of said rollers as described, a dividing bearing ring between said roller sets, having bearing openings in said dividing ring in which the gudgeons of the respective roller sets bear alternately as described, a central shaft about which said rollers rotate and a casing inclosing said rollers substantially as and for the purpose specified.

SPENCER GARWOOD.

In presence of—
T. W. BUFFINGTON,
C. B. HATTON.